(12) United States Patent
Hand et al.

(10) Patent No.: US 7,017,049 B2
(45) Date of Patent: Mar. 21, 2006

(54) METHOD AND SYSTEM PROVIDING SECURE SOCKET LAYER SESSION SHARING BETWEEN NETWORK BASED SERVERS AND A CLIENT

(75) Inventors: Leonard S. Hand, Trophy Club, TX (US); Adam Nemati, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 09/834,193

(22) Filed: Apr. 12, 2001

(65) Prior Publication Data

US 2002/0152403 A1    Oct. 17, 2002

(51) Int. Cl.
*H04L 9/00* (2006.01)

(52) U.S. Cl. .................... 713/200; 713/201
(58) Field of Classification Search ............... 713/150, 713/155, 167–170, 200–201; 380/277; 709/200, 709/203, 217, 223–225, 228–229
See application file for complete search history.

(56) References Cited

U.S. PATENT DOCUMENTS

| | | | |
|---|---|---|---|
| 5,553,242 A | 9/1996 | Russell et al. | |
| 5,825,890 A | 10/1998 | Elgamal et al. | |
| 6,076,108 A | 6/2000 | Courts et al. | |
| 6,094,485 A | 7/2000 | Weinstein et al. | |
| 6,671,818 B1 * | 12/2003 | Mikurak ...................... 714/4 |
| 6,748,426 B1 * | 6/2004 | Shaffer et al. ............... 709/219 |

OTHER PUBLICATIONS

IBM Research Disclosure No. 432173 dated Apr. 10, 2000.

* cited by examiner

*Primary Examiner*—Hosuk Song
(74) *Attorney, Agent, or Firm*—Richard A. Tomlin; Jon A. Gibbons; Fleit, Kain, Gibbons, Gutman, Bongini & Bianco P.L.

(57) ABSTRACT

A method, an apparatus and computer readable medium for transferring Secured Socket Layer (SSL) management information between servers within an informational processing system. The method allows for valid SSL session id information to be moved from any of a plurality of servers to a server containing the desired information to be served to a requesting client. The method for Secured Socket Layer (SSL) management consists of: receiving a request for a SSL session to transfer information with a client; determining that if the request from the client has a current valid session id; and determining if a location of the information in the request from the client is not on a server which is used for the current valid session id, and if the location of the information is not on the server which is used for the current valid session id, then transferring the current valid session id from the server that is used for the current valid session id to a server that contains the requested information.

16 Claims, 7 Drawing Sheets

METHOD AND SYSTEM PROVIDING SECURE SOCKET LAYER SESSION SHARING BETWEEN NETWORK BASED SERVERS AND A CLIENT

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

BACKGROUND OF THE INVENTION

1. Field of the Invention

This invention generally relates to the field of secure communication between networked computers and more particularly to SSL (secure socket layer) sessions in a distributed network.

2. Description of the Related Art

More particularly computer networks such as the Internet are used for the requesting, sending and receiving of secure information. One typical client/server example is communicating through the Internet. Two examples are: First a PC connected to the Internet through an ISP. The second example is a computer, which may be a client or a servers connected to the Internet through an ASP. The protocol in this connection is TCP/IP. This protocol enables fast, direct, and dynamic communication of information. A client computer requests information such as a particular web page. The web site hosting server responds with the information. The format of the data that is transferred is typically HTML. The images transferred are in a format such as GIF and JPEG. All of the information, both data and images, is transferred over an open or unsecured path. Stated differently, the information is exposed and is subject to unauthorized access. For the vast majority of network usage, such as the Internet, unsecured transmission is acceptable. However, secure transmission is desirable for more sensitive information including financial information, medical information and other confidential information. Accordingly, there is a need for secure information transmission.

In response to the need for secure transmissions, certain standards have been adopted. One known standard is SSL (Secure Sockets Layer). SSL is a protocol for managing the security of a message transmission on the Internet. SSL uses a program layer located between the Internet's Hypertext Transfer Protocol (HTTP) and Transport Control Protocol (TCP) layers. SSL was developed by Netscape Corporation. SSL is included as part of most Internet client browsers and web servers including those available from Netscape and Microsoft. The "sockets" part of the term refers to the sockets method of passing data back and forth between a client and a server program in a network or between program layers in the same computer. SSL uses the public-and-private key encryption system invented by RSA (Rivest-Shamir-Adleman), which also includes the use of a digital certificate.

Under normal usage no encryption is used. The use of encryption although desirable has its shortcomings. One shortcoming is that both the client and the server must support the SSL session. Another shortcoming is speed. SSL slows down the transaction because of all of the encryption and de-cryption and checking that is required.

For example, when an airline ticket is purchased over the Internet, the client or customer financial information, such as a credit card is transferred. In this example, if the purchase did not use encryption, a "hacker" could capture the client's credit card information and make unauthorized purchases, thus stealing from the client. In addition the hacker may also gain unauthorized access to the server and cause further damage.

In many secure sessions, multiple purchases are completed. For example, a client or customer buys a book at a particular web site, then customer exits the web site they make an additional purchase such as a DVD or video. Another example is a customer buying airline tickets over the Internet. Immediately after tickets are purchased, a car rental and perhaps a hotel room are also purchased. Under SSL, there is no way to avoid the time for the first SSL session to be set up between the travel web site and the client. But once the SSL session is established the additional purchases may require the same amount of set-up time. The travel web site may be hosted on multiple servers that are assembled and controlled by a load dispatching processor. The use of multiple servers allows for individual products and services to be hosted on different serving computers.

From the point of view of the client, the amount of the wait time for the original first SSL transaction is long. Moreover, once the first SSL session is established, the additional transactions requirement to re-establish the first SSL session with additional servers is very undesirable, especially where the client did not change from the master web site, e.g. moving from car rental to airline reservations all under a single website such as travelocity.com. Accordingly, a need exists for reduced wait time when making additional secure purchases from a given web site.

Turning to the point of view of the hosting enterprise, the servers that are used for SSL transactions are established to serve information securely. As expected these servers use resources including Internet connections, and system time while attempting to serve as many clients as possible. Therefore, once a SSL session is established there is a tendency for the load-dispatching computer to try to maintain this SSL connection for additional transactions. This causes a server "affinity" problem. Affinity is a tendency between a client and a server in a client-server architecture for maintaining an existing SSL session as opposed to starting a new SSL session. In a negative way, affinity is the bias towards assigning a server to a client based on a prior existing SSL session versus the location of the requested data. Affinity is especially a problem in a hosting enterprise, environment where certain products and services are typically hosted across different servers. Prolonged affinity is the source of load-balancing problems, which result in certain servers, being busy while other servers are underutilized. Once a SSL session is established the load-dispatching computer will try to maintain the connection. Accordingly the need exists for the removal of the server affinity with respect to subsequent SSL transactions.

Companies such as F5 Networks have developed SSL accelerators. They are special purpose devices that manage SSL certificates on individual web servers. The SSL accelerators benefit from easier manageability as well as centralized security. In addition, SSL accelerators allow for the servers to be used for serving while the SSL accelerator handles the details of the SSL sessions. Although the use of SSL accelerators is useful, it is not without its shortcomings. One shortcoming is that each time a server is added an accelerator card must be added. This not only becomes expensive but also cumbersome to manage. Accordingly, a need exists for a solution the will maintain security, provide for timely SSL response while scaling easily with a web site's growth.

SUMMARY OF THE INVENTION

Briefly, according to the present invention, disclosed is a method, and apparatus and computer readable medium for managing Secured Socket Layer (SSL) session sharing, whereby an existing SSL session's subsequent transactions are established with minimum additional wait time, while maintaining the existing SSL. A load-dispatching computer recognizes when a client is transferred from one of the servers to another and maintains the SSL session. The transfer from the original server to the next server includes the SSL session ID. This provides for a dramatic reduction in the time to service the second or subsequent SSL sessions.

The method allows for valid SSL session id information to be moved from any of a plurality of servers to a server containing the desired information to be served to a requesting client. The method for Secured Socket Layer (SSL) management consists of: receiving a request for a SSL session to transfer information with a client; determining that if the request from the client has a current valid session id; and determining if a location of the information in the request from the client is not on a server which is used for the current valid session id, and if the location of the information is not on the server which is used for the current valid session id, then transferring the current valid session id from the server that is used for the current valid session id to a server that contains the requested information.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
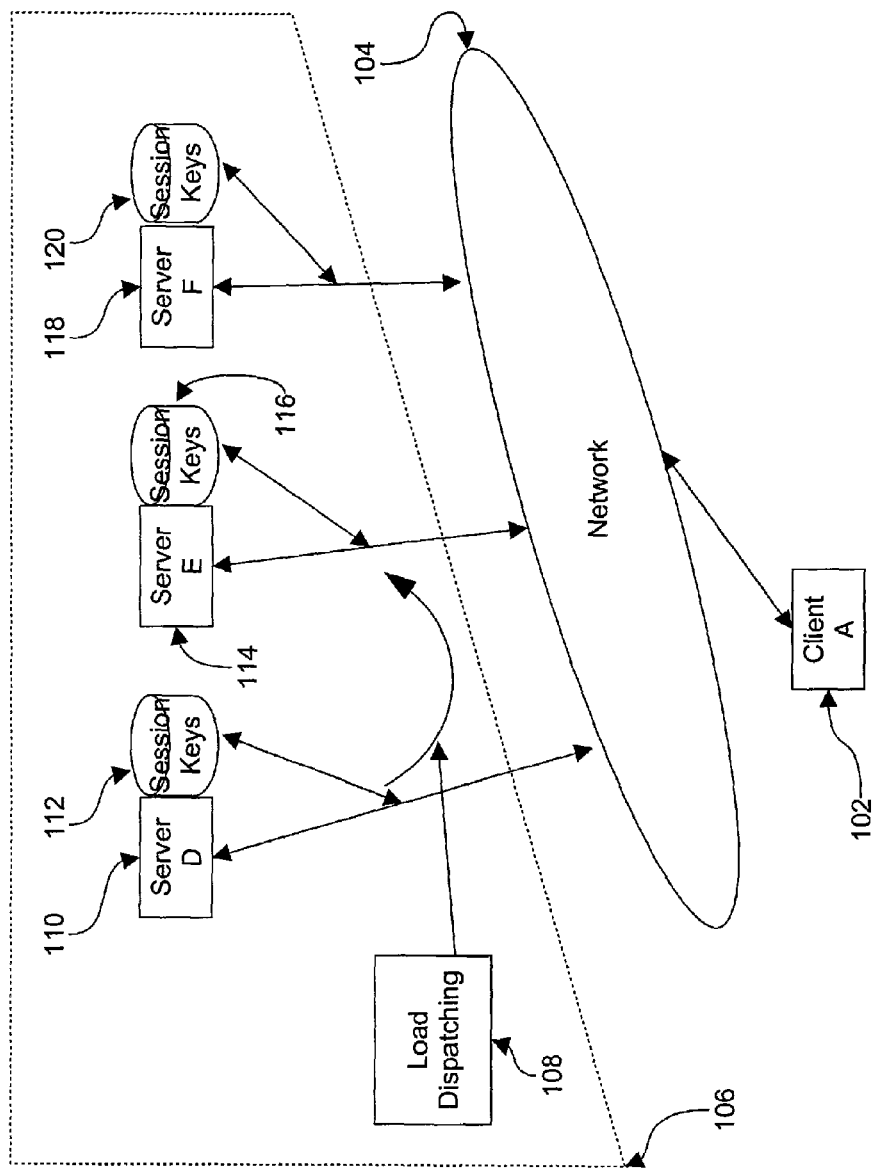
FIG. 1 is a block diagram of a typical prior art Client Server network illustrating Client A 102, a network, a load dispatching processor, and three servers D through F with their associated session keys.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawings like numerals refer to like parts through several views.

Glossary of Terms Used in this Disclosure

Affinity—is a tendency between a client and a server in a client-server architecture for maintaining an existing SSL session as opposed to starting a new SSL session. In a negative way, affinity is the bias towards assigning a server to a client based on a prior existing SSL session versus the location of the requested data.

Cipher—is any method of encryption text (concealing its readability and meaning). It is also sometimes used to refer to the encrypted text message itself although here the term ciphertext is preferred. All serious ciphers use both a key and an algorithm.

Client/Server—describes the relationship between two computer programs in which one program, the client, makes a service request from another program, the server, which fulfills the request.

HTML (Hypertext Markup Language)—is the set of markup symbols or codes inserted in a file intended for display on a World Wide Web browser page. The markup tells the Web browser how to display a Web page's words and images for the user. Each individual markup code is referred to as an element. Some elements come in pairs that indicate when some display effect is to begin and when it is to end.

IP (Internet Protocol)—is the method or protocol by which data is sent from one computer to another on the Internet. Each computer (known as a host) on the Internet has at least one IP address that uniquely identifies it from all other computers on the Internet. When you send or receive data (for example, an e-mail note or a Web page), the message gets divided into little chunks called packets. Each of these packets contains both the sender's Internet address and the receiver's address. Any packet is sent first to a gateway computer that understands a small part of the Internet. The gateway computer reads the destination address and forwards the packet to an adjacent gateway that in turn reads the destination address and so forth across the Internet until one gateway recognizes the packet as belonging to a computer within its immediate neighborhood or domain. That gateway then forwards the packet directly to the computer whose address is specified.

Network—a network is a series of points or nodes interconnected by communication paths. Networks can interconnect with other networks and contain subnetworks. The most common topology or general configurations of networks include the bus, star, and token ring topologies. Networks can also be characterized in terms of spatial distance as local area networks (LAN), metropolitan area networks (metropolitan area network), and wide area networks (wide area network). Networks include wire and wireless communication paths. For the SSL session a "secure network" is a point-to-point communication channel through a non-secure network fabric. This is accomplished using the encryption and decryption methods based on RSA, and TC/IP. The communications path can be both wired and wireless Protocol—in information technology, a protocol is the special set of rules that end points in a telecommunication connection use when they communicate.

SSL (Secure Sockets Layer)—is a commonly used protocol for managing the security of a message transmission on the Internet. SSL uses a program layer located between the Internet's Hypertext Transfer Protocol (HTTP) and Transport Control Protocol (TCP) layers. SSL is included as part of both the secure capable browsers and most Web server products. SSL uses the public-and-private key encryption system from RSA, which also includes the use of a digital certificate.

TCP (Transmission Control Protocol)—uses a set of rules to exchange messages with other Internet points at the information packet level. This method is used along with the Internet Protocol (Internet Protocol) to send data in the form of message units between computers over the Internet. While IP takes care of handling the actual delivery of the data, TCP takes care of keeping track of the individual units of data (called packet) that a message is divided into for efficient routing through the Internet.

Secure Socket Layer Performance

Web sites that use more than one server and require the use of SSL, for performance reasons, use client/server affinity so that successive transaction under the same SSL session can be expedited. However extended affinity can cause performance degradations because of uneven load distribution and this results in poor performance.

The present invention shares the use of the SSL Session information between servers such that server affinity can be eliminated. Thus enabling more balanced and faster distribution of load.

SSL works on the premise of record transfers. A logical SSL "session" can be used across multiple underlying TCP/IP connections. As described in more detail below, there are three fundamental "states" for a SSL session:

SSL States of Security

Figure 3A:
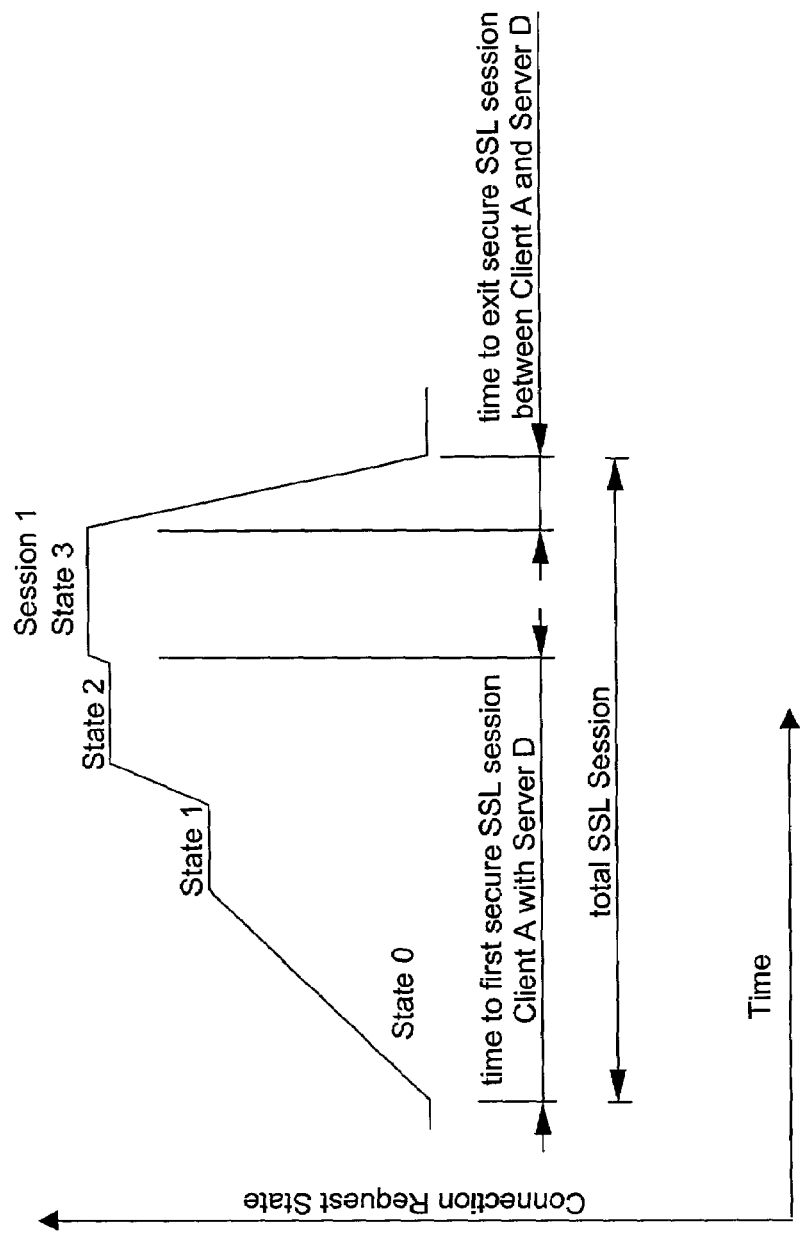
FIG. 3A is a graph of the SSL connection request state against time, as known in the prior art.
Figure 3B:
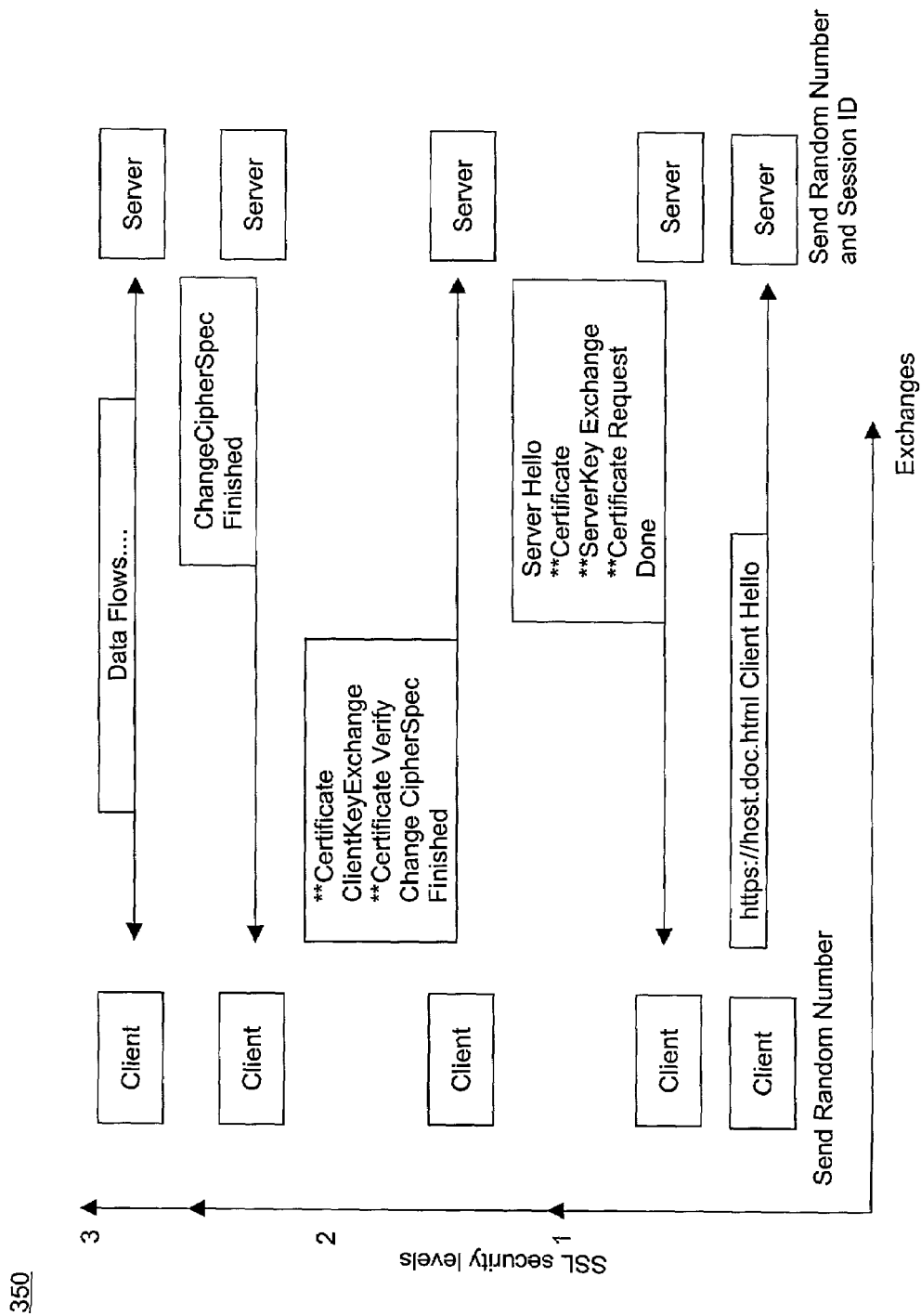
FIG. 3B is a state diagram of the SSL connection request flow between a client and a server, as known in the prior art.

With reference to state diagram 310 of FIG. 3B, the three SSL states are:

STATE ONE: A TCP/IP connection does not exist and an SSL session does not exist. To initiate the use of a SSL connection requires what is known as an SSL full handshake. This SSL session initiation dialog is the most time, resource and packets because a pre-master secret is exchanged and typically a public key exchange takes place between the endpoints of the SSL connection. The Client sends a Hello message to the server, which includes the request for the SSL session and the random number. In turn the server acknowledges the hello by, establishing a certificate, completing the server key exchange, and thus completing the certificate request. An SSL session is considered to exist when an SSL session id exists and is valid.

STATE TWO: An additional TCP/IP connection is required, but an SSL session already exists. This state requires an SSL partial handshake. This partial handshake only requires a subset of the information exchanges in STATE ONE to be exchanged. This information includes a session id and updates a cipher spec. The Server responds by acknowledging the change cipher spec request from the client, thus completing STATE TWO. A client may create more than one TCP/IP connection to support a given SSL session with a specific partner endpoint.

STATE THREE: Both the TCP/IP connection and the SSL session already exist. In this dialog only the encrypted data is exchanged between the endpoints. The SSL overhead in this state is limited to the data encryption/decryption time in the end points. Using a time metric, in one embodiment takes about 400 ms to complete the setup up from STATE ONE through STATE THREE. As communications technologies improve such as the user of fiber optics, the over all time will decrease but the relative times between STATE ONE, STATE TWO and STATE THREE will remain somewhat constant.

SSL Server Affinity

The latency required to exit SSL STATE ONE is significantly higher than exiting STATE TWO. Therefore, one can conclude that SSL performs the best when constantly using STATE THREE. This is why SSL has a strong affinity relationship with a specific server. If a client returns to the same server, the SSL session does not need to be reestablished. The length of time the affinity lasts also has an impact on server resources. Memory trashing and network handshaking overhead are two such examples. If a client, who already has an SSL connection to a first server is redirected to a second server on the same system, the SSL connection enters into STATE ONE. In one embodiment, the present invention provides that if the session ID is transferred from the first server to the second one, the SSL session at the second server can start at STATE TWO as opposed to STATE ONE.

Large sites that use SSL must maintain affinity to keep connections in STATE THREE. The concern is that a server in which affinity has been maintained can become very busy, causing long wait for serving additional clients. The present invention eliminates the requirement of affinity and therefore load-dispatching servers can make assignments faster, without the need of table lookups.

Typical Client/Server Structure

Referring to FIG. 1, shown is a logical block diagram 100 of a typical prior art Client requesting information through a network 104 from a web site 106. Client A 102 is connected to a network such as the Internet 104. The web site 106 is in turned connected to the Internet 104. Within the web site 106 a Load Dispatching processor 108 receives requests for information and based on a look up of an ID location (112–120) of the information assign a server, that is, server D 110, server E 114 or server F 118. Associated with each server (110–118) is the local ID storage (112–120) for the SSL session ID information, or Session Keys. The ID storage for server D 112, server E 116 and server F 120 are not connected to each other directly.

Typical SSL Request Flow Diagram

Figure 2:
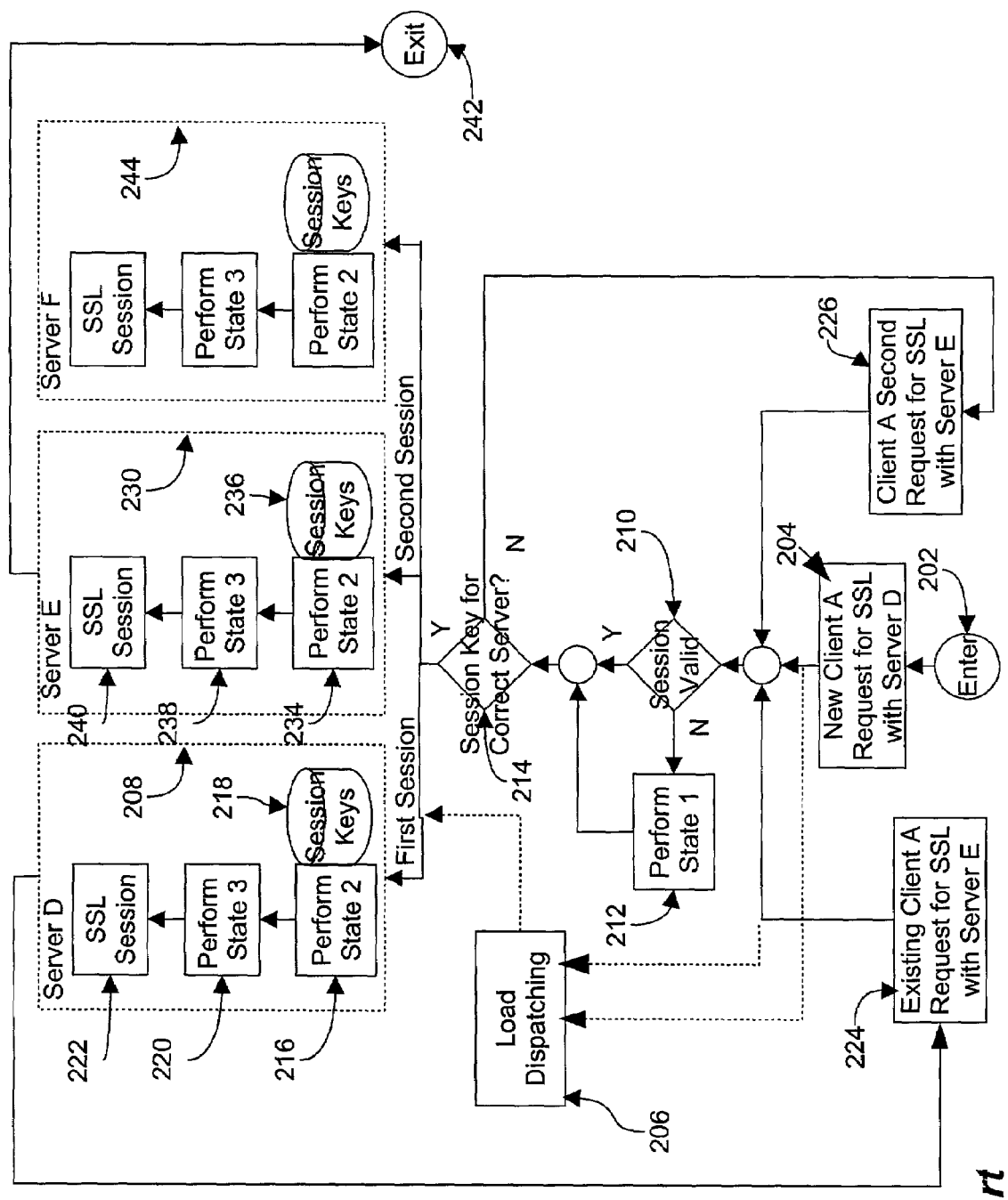
FIG. 2 is a flow diagram of a Client A 102 requesting a SSL session from Server D, then with Server E, as known in the prior art.

Turning now to FIG. 2, illustrated is a flow diagram 200, of an exemplary SSL session as known in the prior art. The flow is drawn bottom to top, entering at the bottom with no security and once at the top having full SSL security. Client A 102 is requesting two SSL sessions. At the beginning of the first session, the request enters the site 202 and requests certain information. The location of this information is determined to be in Server D 208, by the load dispatching processor 206. Client A 102 is interrogated for valid session keys 210. During the first pass through, the session keys are not valid, so SSL STATE ONE 212 is established with Server D 208. A session ID is stored in the storage 218 of Server D 208. Next the client is checked if it's session key is for the correct server 214. As the ID was just built, they are and Client A 102 continues to build the SSL session by performing STATE TWO 216 and STATE THREE 220 and finally can transfer data with Server D during the SSL session 222.

After the SSL session with Server D 208 is completed Client A 102, requests additional information 224. The Load Dispatching processor 206 determines that the information is stored on Server E 230. A check is performed on Client A 102 to determine if it has a valid session 210. This time, it does and without building STATE ONE proceeds to the next check 214 to determine if the session ID is with Server E. It is not, as it was built with Server D 208. Client A 102 exits STATE ONE and performs a second request for information from Server E 226. Client A 102 then performs a Session Valid test 210. As it has just exited STATE ONE it must perform STATE ONE again 212 with Server E 230. After exiting this build, it is checked if the session key is for the correct server 214. It is, and so it proceeds to perform STATE TWO 234 with Server E 230 storing the session keys in this local storage 236. After performing STATE TWO it proceeds to build STATE THREE 238. It can now perform a SSL session 240 with Server E. Once this is completed Client A 102 exits the connection 242.

In this example, Server F 244 is not involved.

SSL Session Security Time Line

Turning now to FIG. 3, shown is a graph 300 of an SSL Connection Request State versus Time. The connection progress is illustrated with increasing security from the bottom of the page towards the top. The time movement is illustrated from left-to-right. Starting on the left Client A 102 is in STATE ZERO i.e., it has not entered a SSL session. The Client A 102 starts to build STATE ONE, then STATE TWO and finally STATE THREE. Note that the STATE levels are illustrated for the concept. There is in reality no plateau or waiting at the different STATE levels. The time to the first secure SSL session between STATE ZERO and STATE THREE is illustrated with most of the time being used between STATE ZERO and STATE ONE. Using a certain metric, about 400 units are used from the very beginning through the increasing security levels, STATES ONE through THREE. The term units are used here refer to an arbitrary unit of time such as milliseconds and is used to show the relative length of establishing a state. It is noted that each SSL session and in general Internet timings are variable.

Note that the time to exit the SSL session is shown to be very fast, and complete.

SSL Session Key Storage and Transfer

Figure 4:
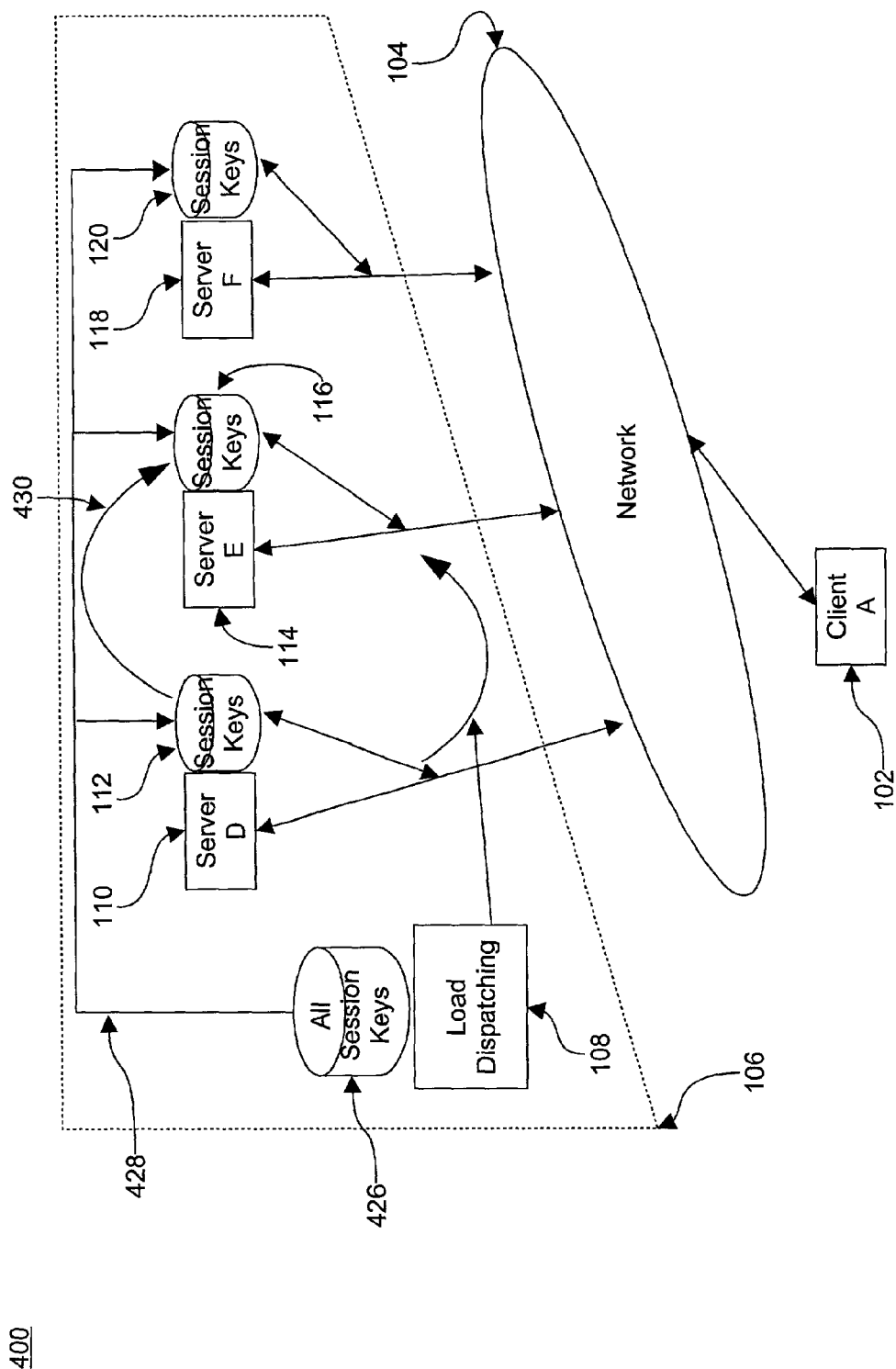
FIG. 4 is a block diagram of a typical Client Server network illustrating Client A 102, the Internet, a load dispatching processor, three servers D through F where all valid sessions keys are kept in a central secure data base and are supplied to the correct server according to the present invention.

Turning now to FIG. 4, shown is a logical block diagram 400 of the present invention as it applies to a web hosting enterprise. Client A 102 is connected to a network such as the Internet 104. The web site 106 is in turned connected to the Internet. Within the web site a Load Dispatching processor 108 receives requests for information and based on a look up of the location of the information assign servers D 110, E 114 or F 118. The Load Dispatching processor contains a location for storing all of the SSL session keys 426, which is secure and lockable. Also shown is a very fast direct connection with the servers ID storage 428.

Associated with each server is local storage for the SSL session ID information, or Session Keys. The ID storage for server D 112, E 116 and F 200 are connected to each other directly 428 and also to the Load dispatching SSL session key storage 426. What is also shown by an arrow 430, is the ability to transfer session keys when called upon by the load dispatching processor 108.

SSL Session Key Storage and Transfer Flow Diagram

Figure 5:
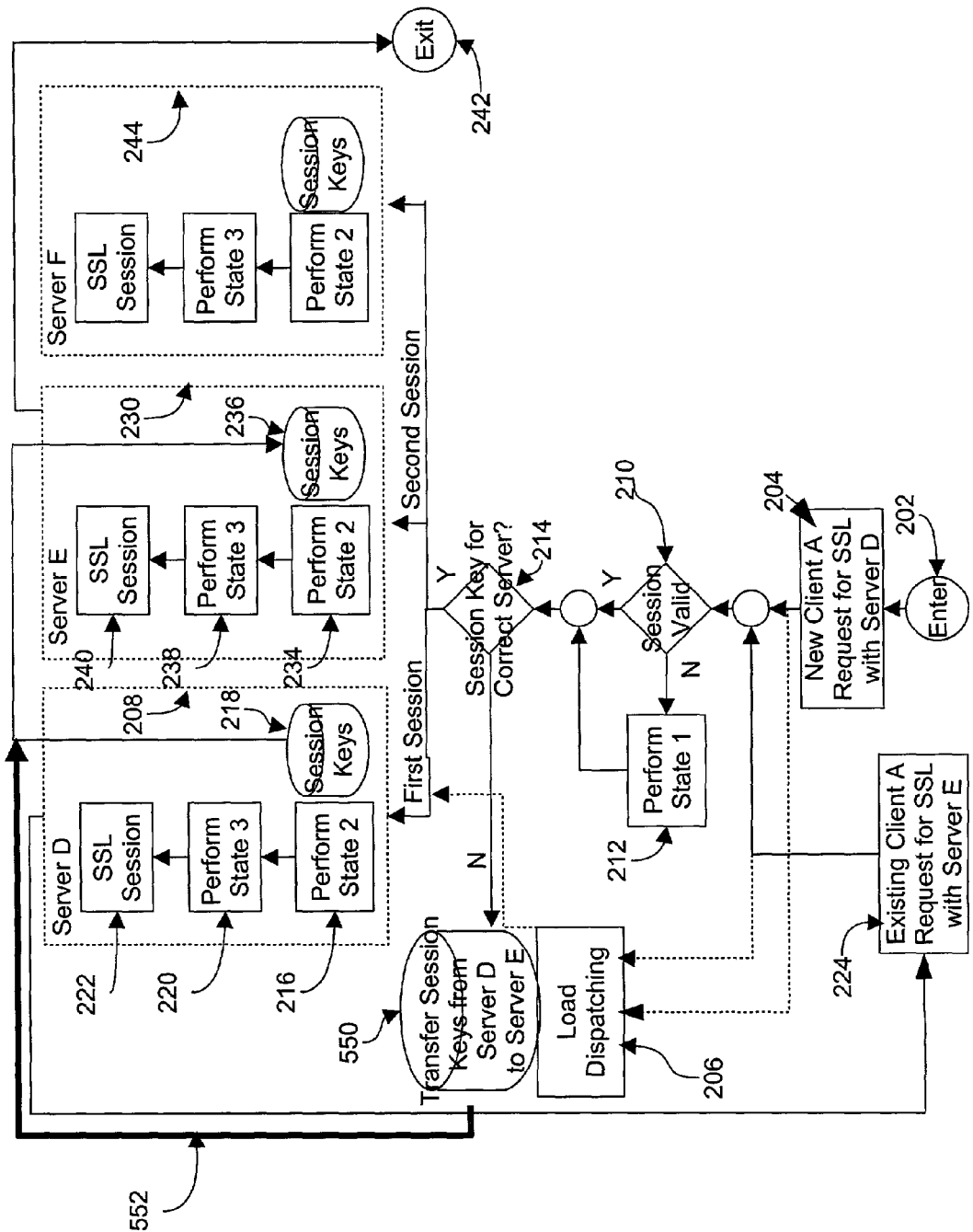
FIG. 5 is a flow diagram taken from the perspective of a Client A 102 requesting a SSL session from Server D then request a SSL session with Server E where in the valid session ID is transferred from Server D to server E, according to the present invention.

Turning now to FIG. 5, shown is a flow diagram 500, of the present invention as it applies to the flow diagram 400 of FIG. 4. The flow is drawn bottom to top, entering at the bottom with no security and once at the top having full SSL security. Client A 102 is requesting two SSL sessions. Client A 102 enters the site 202 and requests certain information. The location of this information is determined to be in Server D 208, by the load dispatching processor 206. Client A 102 is interrogated for valid session keys 210. The first pass through, the session keys are not valid, so a SSL STATE ONE 212 is established with Server D 208. A session ID is stored in the storage 218 of Server D 208 and at the load dispatching processor in the central key storage 550. Next, Client A 102 is checked if the session key is for the correct server 214. As the ID was just built, they are and Client A 102 continues to build the SSL session by performing STATE TWO 216 and STATE THREE 220 and finally can transfer data with Server D 208 during the SSL session 222.

After the SSL session with Server D 208 is completed Client A 102 next requests additional information 224. The Load Dispatching processor 206 determines that the information is stored on Server E 230. A check is performed on Client A 102 to determine if it has a valid session 210, and that the SSL session has not timed out before transferring session information. This time, it does and without building STATE ONE proceeds to the next check 214 to determine if the session ID is with Server E. It is not, as it was built with Server D 208. However the present invention provides for the Load Dispatching processor to transfer the session keys that were built with Server D 208. The session keys are transfers to Server E 230 using a fast connection 552.

Client A 102 now proceeds to perform STATE TWO 234 with Server E 230 storing the session keys in its storage 236. This is accomplished much faster as a result of the transfer of the session keys. After performing STATE TWO it proceeds to build STATE THREE 238. Now a SSL session 240 with Server E 230 is perfomed. Once this is completed Client A 102 exits the connection 242.

As stated in the example for FIG. 2, server F 244 is not involved.

SSL Session Security Time Line Using the Present Invention

Figure 6:
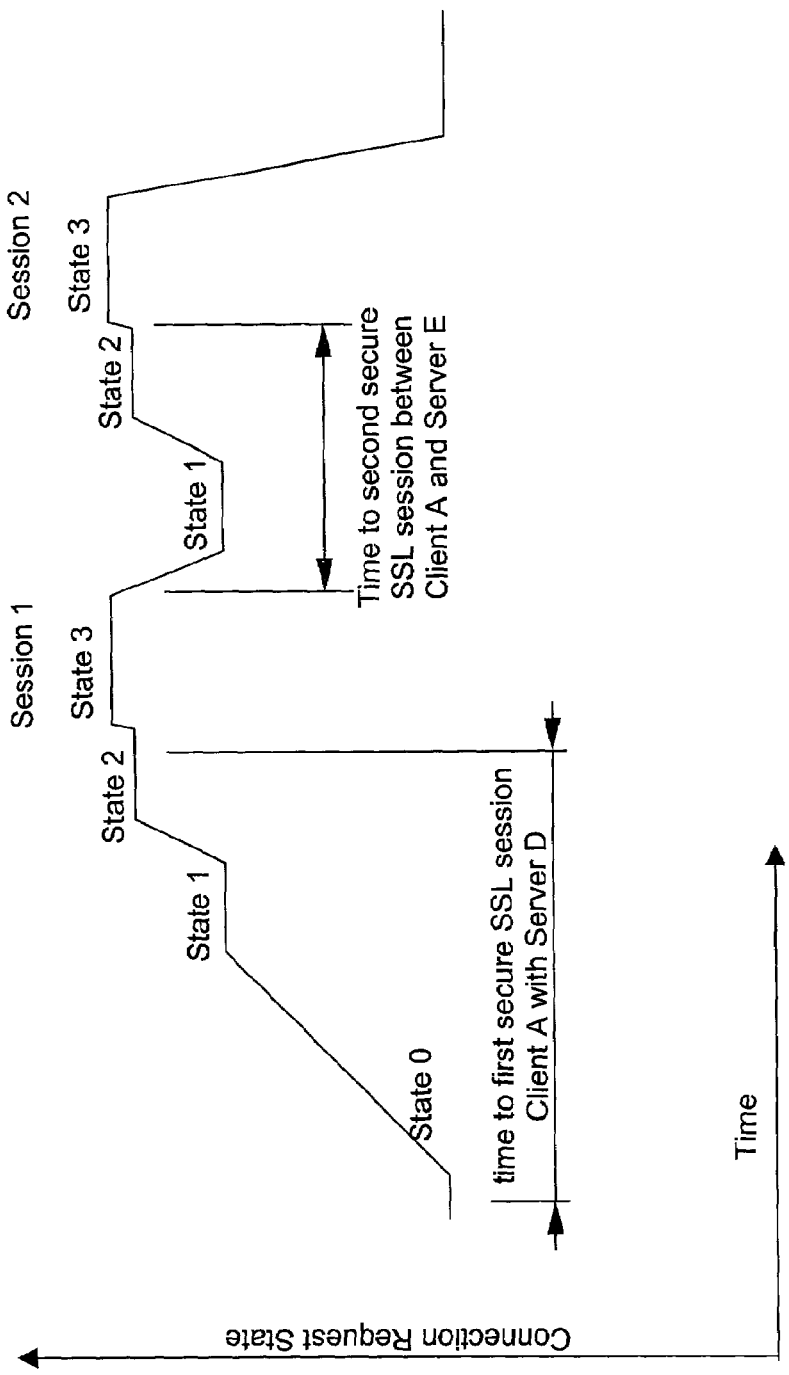
FIG. 6 is a graph of the SSL connection request state against time, according to the present invention.

Turning now to FIG. 6, shown is a graph 600 of an SSL Connection Request State versus Time, according to the present invention. As with FIG. 2, connection progress is illustrated with increasing security from the bottom of the page towards the top. The time movement is illustrated from left-to-right. As with FIG. 2 the time to establish a full SSL session the first time is as follows. Starting on the left Client A 102 is in STATE ZERO i.e., it has not entered a SSL session. The Client A 102 starts to build STATE ONE, then STATE TWO and finally STATE THREE. Note that the STATE levels are illustrated for the concept. There is in reality no plateau or waiting at the different STATE levels.

The time to the first secure SSL session between STATE ZERO and STATE THREE is illustrated with most of the time being used between STATE ZERO and STATE ONE. Using a certain metric, about 400 units are used from the very beginning through the increasing security levels, STATES ONE through THREE. The term units are used here refer to an arbitrary unit of time such as milliseconds and is used to show the relative length of establishing a state. It is noted that each SSL session and in general Internet timings are variable.

Once Session 1 is complete Client A request information that is not in Server D. The load dispatching processor assigns Client A to Server E, which has the information for the second session. The load dispatching processor has accomplished this assignment without respect to the existence of the valid SSL session with Server D. This demonstrates the loss of Server Affinity. The Client exits STATE THREE and then TWO, which ends the SSL session with server D. As explained above in FIG. 5, the SSL session keys are then transferred from Server D to Server E. This allows Client A to stay in STATE TWO, rather then exiting all the way down to STATE ZERO. After the session keys have been transferred, Client A can build STATE TWO and THREE with Server E. This allows the second session to be started in less time than it would have taken to build the session from the STATE ZERO. Using the time metric the prior art would take about 400 units, where as the present invention requires only about 200 units. This results in a savings of about 50%.

SSL Implementations

Many different embodiments to implement the SSL sharing are described. In one embodiment, the present invention uses a single SSL accelerator card such those available from F5, to provide SSL function for many web servers. A high-speed interconnect is coupled between the session id service and the web servers. The web server configurations include a centralized server and a distributed session and hub-based solutions. In an embodiment for a hub-based solution, the hub is really a centralized server approach with a high-speed secure communications channel. Currently there is, what is known as an outer web channel. These are high performance devices that serve content quickly. Essentially making the Outer channel part of the network.

This packaging technology is built on an extension of the "Pizza Box" rack of web servers. It provides for extremely low latency interconnect, with a integrated firewall, and SSL engine. It also provides error recover and fault isolation. Each of these "Pizza Boxes" are hot-plugable and automatically configured by the controller upon replacement.

The SSL sharing in the hub utilizes a high-speed backplane so that "SSL sync" messages can be passed quickly and securely. The hub also affords a centralized, lockable repository for all SSL session information.

Discussion of Hardware and Software Session Key Storage and Transfer

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The usage of SSL sessions today is employed only when required for the protection of commercial transactions and where security is fundament. However it is not used arbitrarily for privacy reasons as the overhead is to high both at the server and at the client. If SSL sessions and particularly security session after the initial setup of an SSL session can be made to be faster then the usage of SSL sessions may grow and be used for additional reasons such as privacy.

Non-Limiting Examples Shown

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method on an information processing system for Secured Socket Layer (SSL) management, including at least one load dispatching processor and at least two servers, comprising the steps of:

receiving a request for a SSL session to transfer information with a client;

determining that if the request from the client has a current valid session id; and determining if a location of the information in the request from the client is not on a server which is used for the current valid session id, and if the location of the information is not on the server which is used for the current valid session id, then transferring the current valid session id from the server that is used for the current valid session id to a server that contains the requested information;

transferring the valid session id information that exists between a first server and a client, to a second server that contains the information being requested by the client;

waiting for the transference of the session id information between the first server that contains valid session id information and the second server; and completing the waiting for the transference of the session id information between the first server and the second server in less time than it would have taken to build valid session id information between the client and the second server directly.

2. The method according to claim 1, wherein the step of determining if the location of the information in the request from the client is not on a server includes transferring the current valid session id from a central storage system.

3. The method according to claim 1, further comprising the step of establishing a SSL session with the client to the server that contains the requested information.

4. The method according to claim 1, further comprising the steps of:

selecting a server that contains the information being requested by the client, wherein the selection is based on whether or not the server has currently established a SSL session with the client; and assigning the client to the server selected.

5. The method according to claim 1, wherein the step of receiving a request for a SSL session includes receiving a SLL request over a wireless network.

6. A method on an information processing system for Secured Socket Layer (SSL) management, including at least one load dispatching processor, at least two servers, and at least one client requesting a SSL session comprising the steps of:

receiving a request for a continuance of the SSL session to transfer information with a client;

sending a request to client for responding to a request from the load dispatching processor for a current valid session id;

receiving sending to the load dispatching processor, the current valid session id;

completing the of the SSL setup transferrin the current valid session id to a server holding information to transfer as requested by the client:

transferring the valid session id information that exists between a first server and a client, to a second server that contains the information being requested by the client;

waiting for the transference of the session id information between the first server that contains valid session id information and the second server; and completing the waiting for the transference of the session id information between the first server and the second server in less time than it would have taken to build valid session Id information between the client and the second server directly.

7. A method of claim 6, wherein the step of sending a request for a SSL session by the client is caused by the requirement for secure information exchange.

8. A method of claim 6, wherein the step of sending a request for a SSL session by the client is caused by the requirement for a private information exchange.

9. An information processing system for shared Secured Socket Layer (SSL) management comprising:

a network interface for coupling at least one client system;

a local network for coupling two or more servers for serving information accessible by each of the servers to the one or more client systems over the network interface, wherein each server includes an interface to a repository of SSL session keys; and at least one load dispatching processor, coupled to the local network, for performing:

receiving a request for a SSL session to transfer information with a client;

determining that if the request from the client has a current valid session id; and determining if a location of the information in the request from the client is not on a server which is used for the current valid session id, and if the location of the information is not on the server which is used for the current valid session id, then transferring the current valid session id from the server that is used for the current valid session id to a server that contains the requested information;

transferring the valid session id information that exists between a first server and a client to a second server that contains the information being requested by the client;

waiting for the transference of the session id information between the first server that contains valid session id information and the second server; and completing the waiting for the transference of the session id information between the first server and the second server in less time than it would have taken to build valid session id information between the client and the second server directly.

10. The information processing system according to claim 9, wherein the at least one load dispatching processor includes an interface to a centralized repository for storing the session keys for each of the two or more servers.

11. The information processing system according to claim 10, wherein the local network includes a back plane and at least two servers are coupled to the back plane.

12. A computer readable storage medium containing programming instructions for Secured Socket Layer (SSL) management, including at least one load dispatching processor and at least two servers, the programming instructions comprising:

receiving a request for a SSL session to transfer information with a client;

determining that if the request from the client has a current valid session id; and determining if a location of the information in the request from the client is not on a server which is used for the current valid session id, and if the location of the information is not on the server which is used for the current valid session id, then transferring the current valid session id from the server that is used for the current valid session id to a server that contains the requested information;

transferring the valid session id information that exists between a first server and a client, to a second server that contains the information being requested by the client;

waiting for the transference of the session id information between the first server that contains valid session id information and the second server; and completing the waiting for the transference of the session id information between the first server and the second server in less time than it would have taken to build valid session id information between the client and the second server directly.

13. The computer readable storage medium according to claim 12, wherein the programming instruction of determining if the location of the information in the request from the client is not on a server includes transferring the current valid session id from a central storage system.

14. The computer readable storage medium according to claim 13, further comprising the programming instruction of establishing a SSL session with the client to the server that contains the requested information.

15. The computer readable storage medium according to claim 12, further comprising the programming instruction of:

selecting a server that contains the information being requested by the client, wherein the selection is based on whether or not the server has currently established a SSL session with the client; and assigning the client to the server selected.

16. The computer readable storage medium to claim 12, wherein the programming instruction of receiving a request for a SSL session includes receiving a SLL request over a wireless network.

* * * * *